United States Patent
Shih et al.

(10) Patent No.: US 11,032,866 B2
(45) Date of Patent: Jun. 8, 2021

(54) METHODS AND RELATED DEVICES FOR MULTI-CONNECTIVITY

(71) Applicant: FG Innovation IP Company Limited, Tuen Mun (CN)

(72) Inventors: Mei-Ju Shih, Hsinchu (TW); Chie-Ming Chou, Hsinchu (TW); Hung-Chen Chen, Hsinchu (TW); Yung-Lan Tseng, Hsinchu (TW)

(73) Assignee: FG Innovation Company Limited, Tuen Mun (HK)

(*) Notice: Subject to any disclaimer, the term of this patent is extended or adjusted under 35 U.S.C. 154(b) by 1 day.

(21) Appl. No.: 16/198,795

(22) Filed: Nov. 22, 2018

(65) Prior Publication Data

US 2019/0166646 A1    May 30, 2019

Related U.S. Application Data

(60) Provisional application No. 62/590,708, filed on Nov. 27, 2017.

(51) Int. Cl.
*H04W 76/27* (2018.01)
*H04W 72/04* (2009.01)
*H04W 76/15* (2018.01)
*H04W 76/19* (2018.01)
*H04W 24/10* (2009.01)
*H04W 88/06* (2009.01)

(52) U.S. Cl.
CPC ........... *H04W 76/27* (2018.02); *H04W 72/04* (2013.01); *H04W 24/10* (2013.01); *H04W 76/15* (2018.02); *H04W 76/19* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 9,763,283 B2* | 9/2017 | Jung | H04W 24/04 |
| 10,440,767 B2* | 10/2019 | Nagasaka | H04W 28/085 |
| 10,516,986 B2* | 12/2019 | Lee | H04W 88/04 |
| 2016/0044599 A1* | 2/2016 | Damnjanovic | H04W 52/48 |
| | | | 455/522 |
| 2016/0044743 A1* | 2/2016 | Xu | H04W 76/34 |
| | | | 370/329 |

(Continued)

FOREIGN PATENT DOCUMENTS

EP    2983445 A    2/2016

OTHER PUBLICATIONS

Kyocera Corp. Clarification of X2AP cause value upon reception of SCG Failure Information 3GPP TSG RAN WG3 Meeting #87bis R3-150798 Apr. 24, 2015(Apr. 24, 2015) the whole document.

(Continued)

*Primary Examiner* — Bunjob Jaroenchonwanit
(74) *Attorney, Agent, or Firm* — ScienBiziP, P.C.

(57) ABSTRACT

A method for multi-connectivity is provided. The method includes: receiving, by a User Equipment (UE), a first Radio Resource Control (RRC) message comprising at least one Secondary Cell Group (SCG) Data Radio Bearer (DRB) configuration from a Master Cell Group (MCG), and reporting, by the UE, failure information to the MCG via a second RRC message, wherein the failure information comprises an SCG failure cause value and at least one first cell identity (ID).

10 Claims, 6 Drawing Sheets

(56) References Cited

U.S. PATENT DOCUMENTS

| | | | |
|---|---|---|---|
| 2016/0157211 A1* | 6/2016 | Kato | H04W 16/32 |
| | | | 455/450 |
| 2016/0212753 A1* | 7/2016 | Wu | H04W 72/085 |
| 2016/0262194 A1* | 9/2016 | Zhang | H04W 76/10 |
| 2016/0286412 A1* | 9/2016 | Kim | H04W 24/02 |
| 2016/0338134 A1* | 11/2016 | Nagasaka | H04W 76/10 |
| 2017/0127473 A1* | 5/2017 | Virtej | H04W 76/15 |
| 2017/0222876 A1* | 8/2017 | Van Der Velde | |
| | | | H04W 12/0401 |
| 2017/0230232 A1* | 8/2017 | Liu | H04W 76/18 |
| 2017/0353987 A1* | 12/2017 | Wu | H04W 72/042 |
| 2018/0035483 A1* | 2/2018 | Nagasaka | H04W 72/0406 |
| 2018/0124850 A1* | 5/2018 | Wu | H04W 76/15 |
| 2018/0199163 A1* | 7/2018 | Chen | H04W 4/06 |
| 2018/0199315 A1* | 7/2018 | Hong | H04W 88/10 |
| 2018/0359149 A1* | 12/2018 | Shaheen | H04L 5/0092 |
| 2019/0082363 A1* | 3/2019 | Park | H04W 80/02 |
| 2019/0116508 A1* | 4/2019 | Kim | H04W 72/0406 |
| 2019/0166570 A1* | 5/2019 | Futaki | H04L 5/0032 |
| 2019/0166646 A1* | 5/2019 | Shih | H04W 72/04 |
| 2019/0182881 A1* | 6/2019 | Teyeb | H04W 76/15 |
| 2019/0253908 A1* | 8/2019 | Fan | H04W 24/10 |
| 2019/0342148 A1* | 11/2019 | Hong | H04W 76/15 |
| 2020/0037382 A1* | 1/2020 | Xiao | H04W 76/16 |
| 2020/0045764 A1* | 2/2020 | Kim | H04W 76/15 |

OTHER PUBLICATIONS

Kyocera Corp. X2AP cause value notation 3GPP TSG-RAN WG3 Meeting #88 R3-151168 May 29, 2015 (May 29, 2015) the whole document.

* cited by examiner

METHODS AND RELATED DEVICES FOR MULTI-CONNECTIVITY

CROSS-REFERENCE TO RELATED APPLICATION(S)

The present application claims the benefit of and priority to a provisional U.S. Patent Application Ser. No. 62/590,708 filed on Nov. 27, 2017, entitled "Handling of Blind Addition Failure" (hereinafter referred to as "the '708 provisional"). The disclosure of the '708 provisional is hereby incorporated fully by reference into the present application.

FIELD

The present disclosure generally relates to wireless communication, and more particularly, to methods and related devices for multi-connectivity.

BACKGROUND

In the next-generation (e.g., fifth generation (5G) New Radio (NR)) wireless network, multi-connectivity including Dual-Connectivity (DC) is envisioned to support more capacity, data, and services. A User Equipment (UE) configured with multi-connectivity may connect to a Master Node (MN) as an anchor and one or more Secondary Nodes (SNs) for data delivery. Each node may be formed by a cell group that includes one or more cells. For example, an MN may be formed by a Master Cell Group (MCG), and an SN may be formed by a Secondary Cell Group (SCG). The MCG and the SCG may each include one or more cells. All cell groups are not necessarily the same type. For example, one cell group can be a Long Term Evolution (LTE) or an evolved LTE (eLTE) cell group, while another cell group can be an NR cell group. Regarding the Core Network (CN), taking Evolved Universal Terrestrial Radio Access (E-UTRA) for example, the CN that E-UTRA connects to can be the Evolved Packet Core (EPC) or NextGen (NG) Core (NGC) or 5G Core Network (5GC). eLTE is also known as LTE connected to 5GC. In MR (Multi-RAT)-DC (e.g., NR-NR DC, EN (E-ULTRA-New Radio)-DC, NGEN (NG-RAN E-UTRA-NR)-DC or NE (New Radio-E-UTRA)-DC) case, each network node may have its own Radio Resource Control (RRC) entity, but the UE's RRC entity may follow that of the MN.

While a UE configured with multi-connectivity can maintain simultaneous connections with one MN and at least one SN, in some cases, the UE cannot successfully add a cell group as an SN because an SN addition failure occurs.

Thus, there is a need in the art for an improved multi-connectivity scheme for handling the failure of SN addition.

SUMMARY

The present disclosure is directed to methods and devices for multi-connectivity.

In an aspect of the present disclosure, a UE for multi-connectivity is provided. The UE includes one or more non-transitory computer-readable media having computer-executable instructions embodied thereon and at least one processor coupled to the one or more non-transitory computer-readable media. The at least one processor is configured to execute the computer-executable instructions to: receive a first RRC message comprising at least one SCG Data Radio Bearer (DRB) configuration from an MCG, and report failure information to the MCG via a second RRC message, wherein the failure information comprises an SCG failure cause value and at least one first cell identity (ID).

In an aspect of the present disclosure, a method for multi-connectivity is provided. The method includes: receiving, by a UE, a first RRC message comprising at least one SCG DRB configuration from an MCG, and reporting, by the UE, failure information to the MCG via a second RRC message, wherein the failure information comprises an SCG failure cause value and at least one first cell ID.

In an aspect of the present disclosure, a base station for multi-connectivity is provided. The base station includes one or more non-transitory computer-readable media having computer-executable instructions embodied thereon and at least one processor coupled to the one or more non-transitory computer-readable media. The at least one processor is configured to execute the computer-executable instructions to: transmit a first RRC message comprising at least one SCG DRB configuration to a UE, and receive failure information from the UE via a second RRC message, wherein the failure information comprises an SCG failure cause value and at least one first cell ID.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
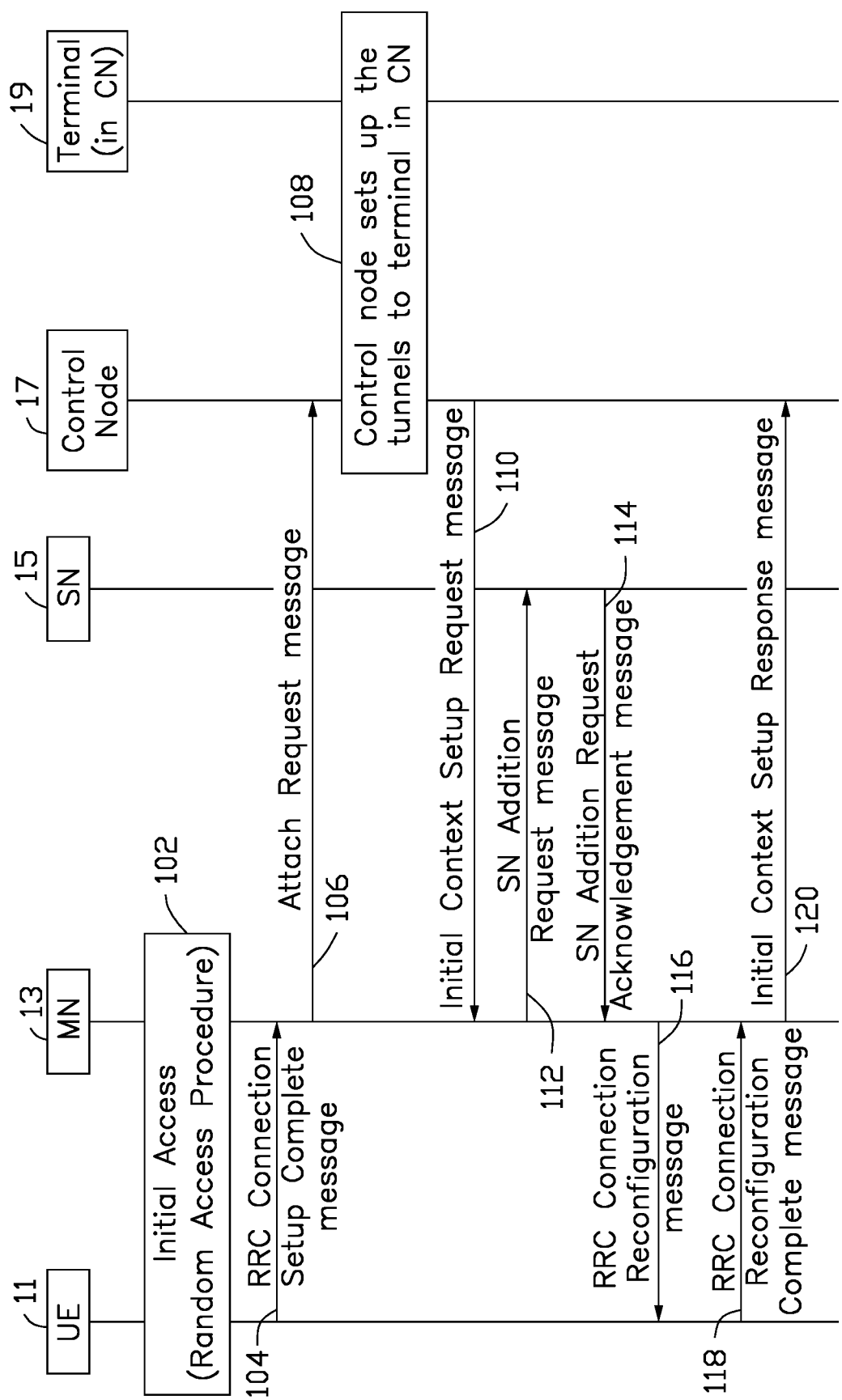
FIG. 1 shows a message flow of a general procedure among multiple entities of a wireless communication system.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may differ in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station may be operable to provide radio coverage to a specific geographical area using a plurality of cells included in the RAN. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the Downlink (DL) and optionally Uplink (UL) resources to at least one UE within its radio coverage for DL and optionally UL packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval of a single NR frame, a DL transmission data, a guard period, and an UL transmission data should at least be included, where the respective portions of the DL transmission data, the guard period, the UL transmission data should also be configurable, for example, based on the network dynamics of NR. In addition, sidelink resource may also be provided in an NR frame to support ProSe services.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

To support multiple connectivity (e.g., EN-DC) in the next generation network (e.g., 5G NR), an MN may perform SN addition to add a network node as an SN for the UE. Compared to the normal SN addition that the target SN is selected based on the measurement report from the UE, a new type of SN addition procedure called "SN blind addition" may be used to help the MN add the SN. During the blind addition, the MN is allowed to add one or more SNs for a UE, without configuring the UE to perform specific measurements as a basis for selecting the SN(s). For example, the MN may add the SN for the UE during an initial UE context setup procedure with little (or limited) or no measurement results from the UE. The MN may use the first RRC message (e.g., RRC (Connection) Reconfiguration message) following the RRC connection establishment to carry the corresponding SCG configuration. Without setting up any MCG bearer (e.g., MN terminated MCG bearer) first, the SCG bearer or split bearer (MN terminated or SN terminated) can be set up during a UE context setup procedure. The MN may identify the target SN before (or during) the initial UE context setup procedure, and add the target SN during the initial UE context setup procedure. Such blind addition may take place (but not limited to) when the MN and SN are co-located. In MR-DC cases, MCG bearer may refer to a radio bearer with a Radio Link Control (RLC) bearer (or at least two RLC bearers, in case of Carrier Aggregation (CA) packet duplication) only in the MCG. In MR-DC cases, SCG bearer may refer to a radio bearer with an RLC bearer (or at least two RLC bearers) only in the SCG. In MR-DC cases, split bearer may refer to a radio bearer with RLC bearers both in MCG and SCG. RLC bearer may refer to RLC and Medium Access Control (MAC) logical channel configuration of a radio bearer in one cell group. In MR-DC cases, MN terminated bearer may refer to a radio bearer for which Packet Data Convergence Protocol (PDCP) is located in the MN. In MR-DC cases, SN terminated bearer may refer to a radio bearer for which PDCP is located in the SN.

FIG. 1 shows a message flow of a general procedure among multiple entities of a wireless communication system. As shown in FIG. 1, the entities of the wireless communication system include a UE 11, an MN 13, an SN 15, a control node 17 and a terminal 19 in CN. The control node 17 may be a Mobility Management Entity (MME) or an Access and Mobility Management Function (AMF). The terminal 19 may be a Serving Gateway (S-GW), a Session Management Function (SMF) or a User Plane Function (UPF).

The procedure includes actions 102, 104, 106, 108, 110, 112, 114, 116, 118 and 120. As shown in FIG. 1, in action 102, the UE 11 performs an initial access procedure (e.g., Random Access (RA) procedure) with the MN 13. After the UE 11 successfully finishes the initial access procedure, in action 104, the UE 11 transmits an RRC message (e.g., an RRC (Connection) Setup Complete message) to the MN 13. Then in action 106, the MN 13 sends an Attach Request message to inform the control node 17 that the UE 11 attempts to attach to (or register on) the CN (e.g., via the control node 17). In some implementations, the Attach Request message may include, for example, the Non-Access Stratum (NAS) information (e.g., Information Element (IE) dedicatedInfoNAS, and dedicated NAS Protocol Data Unit (PDU)) of the UE (e.g., the UE 11) in the RRC message (e.g., RRC (Connection) Setup Complete message (e.g., RRCConnectionSetupComplete)). In some implementations, the message from the MN 13 to the control node 17 in action 106 may be replaced by a Registration Request message, depending on the used wireless communication technology (e.g., LTE or 5G NR).

Upon receiving the Attach Request message, in action 108, the control node 17 may set up tunnel(s) to a terminal 19 in CN after a terminal selection procedure (e.g., S-GW or SMF selection function) is performed. In some implementations, the control node 17 may send a Create Session Request message to the selected terminal in CN (e.g., the terminal 19) during the terminal selection procedure. If the selected terminal 19 accepts the request, the terminal 19 may reply the control node 17 with a Create Session Response message. In some implementations, the Create Session Response message may include the identification information of the terminal (e.g., the terminal 19), which includes at least one of the Transport Layer Address (TLA) of the terminal 19 for user plane, the Tunnel Endpoint Identifier (TEID) of the terminal 19 for S1-U or NG-U user plane, and the TEID of the terminal 19 for control plane.

In action 110, the control node 17 may respond to the MN 13 with an Initial Context Setup Request message including the identification information of the terminal (e.g., the terminal 19). For example, the Initial Context Setup Request message may include at least one of: the terminal's TLA and TEID(s), Evolved Radio Access Bearer (E-RAB) ID, Evolved Packet System (EPS) bearer ID or PDU session ID, and Quality of Service (QoS) flow ID.

In action 112, the MN 13 may send an X2 Application Protocol (X2AP)/Xn Application Protocol (XnAP) message (e.g., SN Addition Request message) to the target SN 15. In various implementations of the present disclosure, the SN Addition Request message may be or include an inter-node RRC message from the MN 13 to the target SN 15. The SN Addition Request message may include at least one of: the TLA and TEID(s) of the terminal in CN (e.g., the terminal 19), default EPS bearer ID (or default PDU session ID), UE ID, System Frame Number (SFN) or subframe offset between the MN (e.g., the MN 13) and the SN (e.g., the SN 15), QoS flow ID, and first configuration information (e.g., SCG-ConfigInfo or CG-ConfigInfo). The first configuration information may include at least one of: the LTE or NR capability of the UE (e.g., the UE 11) and the secondary RAT specific capability (e.g., NR-Capability or EUTRA-Capability) to the SN (e.g., the SN 15).

In some implementations, the first configuration information (e.g., SCG-ConfigInfo or CG-ConfigInfo) contained in the inter-node RRC message (e.g., an (S)CG-ConfigInfo message, an SN Addition Request message) may further indicate whether the MCG bearer (e.g., MN terminated MCG bearer) is built or not. The inter-node messages are sent either across the X2, Xn or the NG interface. The inter-node messages are sent either to or from the BS (e.g., eNB, ng-eNB, or gNB). The inter-node message (e.g., an (S)CG-ConfigInfo message, an SN Addition Request message) from the MN 13 to the SN 15 is also known as SN Addition Request message from the Xn (or X2) interface perspective. For example, the first configuration information may include a Boolean IE (e.g., establishedMCGBearer) to indicate whether the MCG bearer is built. For example, the first configuration information may include an IE (e.g., radioResourceConfigDedMCG) to indicate the MCG radio configuration. If such IE is empty, the target SN (e.g., the SN 15) can understand that the MCG bearer is not yet established. In some implementations, the first configuration information may further indicate the target SN (e.g., the SN 15) to build the MN terminated MCG bearer, the split bearer or the SCG bearer. For example, the first configuration information may include a container (e.g., RadioBearerConfig) to request and indicate the radio bearer configuration and restriction (e.g., L2 buffer size share for the UE capability coordination purpose) in the target SN. For example, the container may include the IE (e.g., DRB-ToAddModList or DRB-ToAddModListSCG) about the SCG DRB configuration. This IE may include a list of DRB configuration (e.g., DRB-InfoListSCG). The DRB configuration in the list may include DRB-specific information containing, for example, at least one of: the DRB ID, the PDCP configuration, the Service Data Adaptation Protocol (SDAP) configuration, the EPS bearer ID or the PDU session ID, the QoS flow ID, and the DRB type (e.g., the MN terminated MCG bearer, the SN terminated MCG bearer, the MN terminated split bearer, the SN terminated split bearer, the MN terminated SCG bearer, or the SN terminated SCG bearer). In some implementations, there may be maximum 32 PDU sessions, for example, ranging from 1 to 32.

If the target SN 15 verifies that it can support the UE 11's capability, the target SN 15 may establish the connection (or tunnel) to the terminal 19 in CN because the target SN 15 has the terminal 19's TLA and TEID(s). If the target SN 15 acknowledges to be added, the target SN 15 may build the radio bearer to the UE 11, so that when the UL data arrives at the SN 15, the SN 15 can send the data to the terminal 19 in CN via S1-U or NG-U (e.g., N3) interface.

Figure 2:
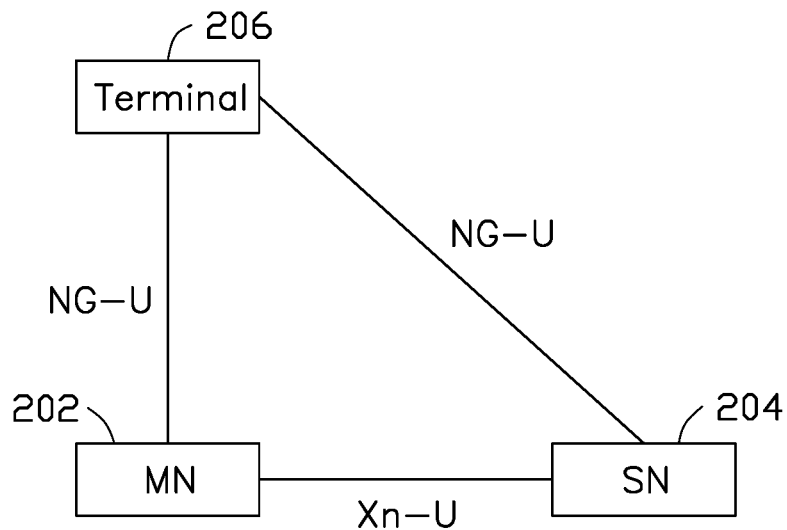
FIG. 2 shows interfaces among different network nodes in the MR-DC with 5GC cases.
Figure 3:
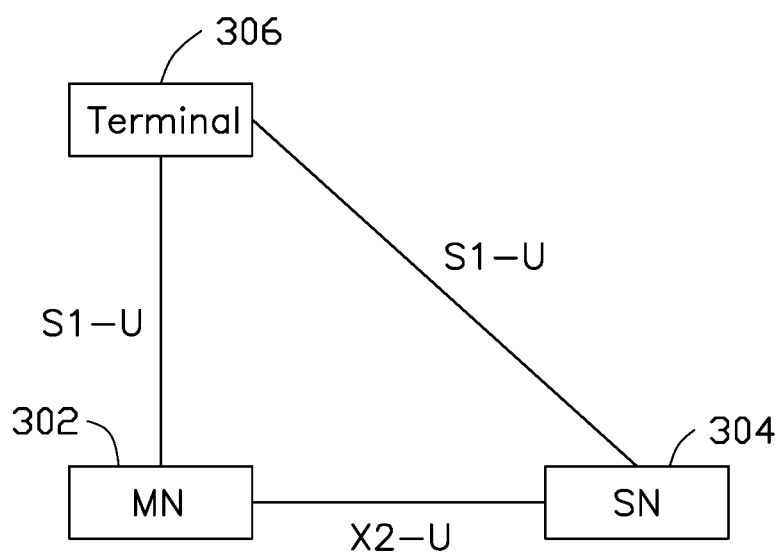
FIG. 3 shows interfaces among different network nodes in the EN-DC case.

In various implementations of the present disclosure, the SCG bearer or the split bearer may be built without building the MCG bearer (e.g., MN terminated MCG bearer) first. In an NGEN-DC case or an NE-DC case, the MCG bearer, the SCG bearer and the split bearer may be built using NR-PDCP respectively. There may be one SDAP entity in the MN (e.g., the MN 13) and one in the SN (e.g., the SN 15), which map the QoS flows to the MCG bearer, SCG bearer and split bearer, respectively. There may be a one-on-one mapping between the PDU session ID and the NG3 Tunnel ID. The MN (e.g., the MN 13) may send the inter-node RRC message including the default PDU session ID, or NG3 (e.g., N3) Tunnel ID, or default QoS Flow ID to the target SN (e.g., the SN 15). As shown in FIG. 2, if the MN terminated bearer (e.g., MN terminated MCG bearer, MN terminated SCG bearer, MN terminated split bearer) is established, the NG3 (e.g., N3) tunnel is built between the MN 202 and the terminal 206 (e.g., UPF) in CN via the NG-U interface. If the SN terminated bearer (e.g., SN terminated MCG bearer, SN terminated SCG bearer, SN terminated split bearer) is established, the NG3 (e.g., N3) tunnel is built between the SN 204 and terminal 206 via NG-U interface. On the other hand, for an EN-DC case, the SCG bearer and the split bearer (e.g., SN terminated split bearer) are built using NR PDCP, respectively. The MCG bearer is built using either NR PDCP or E-UTRA PDCP. There is a one-on-one mapping between the S1 bearer and the DRB. If the MCG bearer (e.g., MN terminated MCG bearer) is not built, the SCG bearer or the split bearer is built to map to the default S1 bearer. The MN may send an inter-node RRC message including at least one of: the default EPS bearer ID, the E-RAB ID, and the S1 Tunnel ID to the target SN. As shown in FIG. 3, if the MN terminated bearer (e.g., MN terminated MCG bearer, MN terminated SCG bearer, MN terminated split bearer) is established, the S1 tunnel is built between the MN 302 (e.g., MeNB) and the terminal 306 (e.g., S-GW) via S1-U interface. If the SN terminated bearer (e.g., SN terminated MCG bearer, SN terminated SCG bearer, SN terminated split bearer) is established, the S1 tunnel is built between the SN 304 (e.g., SgNB) and terminal 306 (e.g., S-GW) via S1-U interface.

Refer to FIG. 1 again. In action 114, the SN 15 may reply an X2AP/XnAP message (e.g., SN Addition Request Acknowledgement message) to the MN 13. The SN Addition Request Acknowledgement may include, for example, the TLA and TEID(s) of the SN (e.g., the SN 15).

In various implementations of the present disclosure, the SN Addition Request Acknowledgement message may be or include an inter-node RRC message (e.g., an (S)CG-Config message) including second configuration information (e.g., SCG-Config or CG-Config), from the Xn (or X2) interface perspective. In some implementations, the second configuration information may include the full radio configuration in the SCG. In another implementation, the second configuration information may include the radio configuration in the SCG, which is different from that in the first configuration information (e.g., SCG-ConfigInfo or CG-ConfigInfo). The target SN 15 may send the inter-node RRC message (e.g., an (S)CG-Config message, an SN Addition Request Acknowledgement message) to the MN 13 to indicate whether the target SN 15 finishes the tunnel establishment to the terminal 19 and the radio bearer establishment. If the target SN 15 has completed the tunnel establishment and the radio bearer establishment, the target SN 15 may further include the SN TLA in the inter-node RRC message (e.g., an (S)CG-Config message, an SN Addition Request Acknowledgement message).

In some implementations, the second configuration information may include at least one of: the IE related to the logical channels to be removed (e.g., LCH-ToRemoveList), the IE related to the logical channels to be added (e.g., LCH-ToAddModList), the MAC configuration (e.g., mac-CellGroupConfig), and a plurality of serving cell configurations (e.g., ServingCellConfig). In the IE related to the logical channels to be added, there may be a plurality of DRB-specific information items, such as the DRB ID (e.g., drb-ID), the RLC configuration (e.g., rlc-Config) and the MAC-Logical Channel configuration (e.g., mac-LCH-Config), the DRB type (e.g., SN terminated MCG bearer, split bearer or SCG bearer), and the EPS bearer ID or the PDU session ID.

In some implementations, the target SN 15 may include the changed configuration in the second configuration information, compared to the configuration from the first configuration information. For example, based on the configuration received in the first configuration information from the MN 13, the SN 15 may change the configuration and notify the MN 13 of the changed configuration in the second configuration information.

In some implementations, the second configuration information may include the SCG radio configuration specific IE (e.g., scg-RadioConfig, or scg-RB-Config). This IE may represent the SCG part configuration included in another IE (e.g., SCG-ConfigPartSCG). For example, SCG-ConfigPartSCG may include the information on the radio resource configuration (e.g., the SDAP configuration, the DRB information, the MAC configuration for the SCG, and information on the radio link failure management) for the SCG, and this information may be included in another IE (e.g., radioResourceConfigDedicatedSCG). The DRB information may be included in another IE (e.g., DRB-ToAddModListSCG), which includes a list of DRB configuration. Each DRB-specific configuration may be included in another IE (e.g., DRB-ToAddModSCG), which consists at least one of: the DRB ID, the DRB type (e.g., SN terminated MCG bearer, split bearer or SCG bearer), the EPS bearer ID or the PDU session ID, the (NR) PDCP configuration, the SDAP configuration, the RLC configuration, the logical channel IDs, and the logical channel configuration. The MAC configuration for the SCG may be included in anther IE (e.g., MAC-MainConfig, or MAC-CellGroupConfig). The information on radio link failure management may be included in another IE (e.g., RLF-TimersAndConstantsSCG or RLF-TimersAndConstants) to indicate the timer (e.g., t313) and counters (e.g., n313, n314).

In action 116, the MN 13 may transmit an RRC message (e.g., RRC (Connection) Reconfiguration message) to the UE 11.

In some implementations, if the MN 13 identifies that the target SN 15 replies with the SN TLA and TEID upon the MN 13 receives the X2AP/XnAP message (e.g., SN Addition Request Acknowledgement message), the MN 13 may regard that the target SN 15 accepts to build the connection between the target SN 15 and the terminal 19 in CN. Afterwards, the MN 13 may send the RRC message (e.g., RRC (Connection) Reconfiguration message) to the UE 11. The RRC (Connection) Reconfiguration message may encapsulate the inter-node RRC message (e.g., SCG-Config message, CG-Config message, SN (e.g., in NR) RRC PDU) which includes the second configuration information (e.g., the IE SCG-Config or the IE CG-Config).

The RRC message (e.g., RRC (Connection) Reconfiguration message) may include the NAS information of the UE (e.g., the UE 11) in the IE dedicatedInfoNAS (e.g., IE dedicatedInfoNAS-Message). In some implementations, the UE's NAS information may be encapsulated in the Initial Context Setup Request message and received by the MN 13. In some implementations, the RRC message (e.g., RRC (Connection) Reconfiguration message) may include a list of DRB-specific dedicatedInfoNAS IEs (e.g., IE dedicatedNAS-MessageList).

In some implementations, the RRC message (e.g., RRC (Connection) Reconfiguration message) may include third configuration information (e.g., the IE SCG-Configuration or CG-Configuration) which conveys the SCG configuration to the UE 11. The third configuration information may include at least one of: the SCG radio resource configuration information in the IE RadioResourceConfigDedicatedSCG (or RadioResourceConfigDedicatedCG), and the PSCell information such as the physical cell ID, the SCell index and the Absolute Radio-Frequency Channel Number (ARFCN) value for the DL carrier frequency in the IE PSCellToAddMod. Other configuration to build the MN terminated bearer (e.g., SCG bearer, split bearer) or SN terminated bearer (e.g., MCG bearer, SCG bearer, split bearer) may be needed in third configuration information, such as the SDAP configuration, the NR PDCP configuration, the RLC configuration, and the MAC configuration.

In some implementations, the RRC message (e.g., RRC (Connection) Reconfiguration message) may include the radio bearer configuration (e.g., RadioBearerConfig) which consists of the list of DRB to be released (e.g., IE DRB-ToReleaseList), the list of DRBs to be added or modified (e.g., IE DRB-ToAddModList) and the list of Signaling Radio Bearers (SRBs) to be added or modified (e.g., IE SRB-ToAddModList). In the IE DRB-ToAddModList, there may be a plurality of DRB-specific configurations such as the DRB ID, the (NR) PDCP configuration, and the SDAP configuration if the SN is the gNB in NR. Moreover, the DRB ID in the IE DRB-ToAddModList may correspond to the DRB ID in the configuration (e.g., IE LCH-ToAddModList) included in the IE SCG-Config (or CG-Config). The RRC message (e.g., RRC (Connection) Reconfiguration message) may also include the second configuration information. For example, the second configuration information may include the information of the list of logical channels to be removed (e.g., IE LCH-ToRemoveList) and the DRB-specific configuration such as the DRB ID, the RLC Configuration, and the MAC LCH Configuration in the configuration (e.g., IE LCH-ToAddModList), and the MAC Cell Group Configuration information (e.g., mac-CellGroupConfig). In some implementations, the target SN ID (e.g., the physical cell ID or the SCell index) may also be included in the IE DRB-ToAddModList or the IE SCG-Config (or CG-Config). In some implementations, the radio bearer configuration (e.g., RadioBearerConfig) is per SN ID, and/or the IE SCG-Config (or CG-Config) is per SN ID. Thus, the target SN ID (e.g., physical cell ID and/or SCell index) may be included in the RRC message (e.g., RRC (Connection) Reconfiguration message).

In some implementations, the MN 13 may include one bit to indicate a blind addition configuration. In some implementations, the RRC message (e.g., RRC (Connection) Reconfiguration message) may include the IE ReconfigurationCause: blind addition, to notify the UE 11 that such RRC message (e.g., RRC (Connection) Reconfiguration message) is for the purpose of blind addition. Upon receiving the RRC message (e.g., RRC (Connection) Reconfiguration message), the UE 11 may configure the SN terminated bearer (e.g., SN terminated SCG bearer, SN terminated split bearer, or SN terminated MCG bearer) based on the SCG configuration information in the RRC message (e.g., RRC (Connection) Reconfiguration message). In some implementations, if the RRC message (e.g., RRC (Connection) Reconfiguration message) includes one bit to indicate the blind addition or includes the reconfiguration cause (e.g., ReconfigurationCause), the UE 11 may further confirm that this is the blind addition without building the MN terminated bearer (e.g., MCG bearer) first.

In action 118, the UE 11 replies the MN 13 with an RRC message (e.g., RRC (Connection) Reconfiguration Complete message).

If the MN 13 successfully adds the SN 15, in action 120, the MN 13 may send an Initial Context Setup Response message to the control node 17. In some implementations, the Initial Context Setup Response message may include the SN 15's identification information, which may correspond to, for example, the E-RAB ID or PDU session ID provided by the control node 17 to the Default EPS bearer or the Default PDU session, for the DL traffic on S1-U or NG-U reference point. In some implementations, the SN's identification information may include at least one of: the SN's TEID and TLA.

After receiving the Initial Context Setup Response message from the MN 13, the control node 17 may send a message including the SN 15's identification information (e.g., the SN 15's TEID and the SN 15's TLA) to the terminal 19 in CN, so that when the DL data arrives, the terminal 19 can deliver the DL data to the SN 15 via S1-U or NG-U interface.

In various implementations of the present disclosure, the TLA of a network node can be replaced with any identifier representing the network node's address, for example, Internet Protocol (IP) address. Furthermore, the TEID can be replaced with any identifier representing the tunnel endpoint identifier.

In various implementations of the present disclosure, the SCG bearer, split bearer (MN terminated or SN terminated), or SN terminated MCG bearer may be built without building the MN terminated MCG bearer firstly. However, the present disclosure is not limited to thereto. For example, if the Initial Context Setup Response message also includes the MN 13's TLA and the MN 13's TEID for the DL traffic on the S1-U/NG-U reference point, the control node 17 can send the message including the MN 13's TLA and TEID to the terminal 19. Thus, if the DL traffic comes, the terminal 19 can deliver the data to the MN 13.

In various implementations of the present disclosure, if the target SN (e.g., the SN 15) fails to establish the tunnel to the terminal (e.g., the terminal 19) in CN and/or the radio bearer for the UE (e.g., the UE 11), the target SN may identify that the SN addition fails. If the SN addition fails, the target SN may send the cause value in the X2AP/XnAP message (e.g., SN Addition Request Acknowledgement message) and/or in the inter-node RRC message (e.g., (S)CG-Config message) to the MN. If the SN addition fails, the target SN may send the X2AP/XnAP message (e.g., SN Addition Request Acknowledgement message) and/or the inter-node RRC message (e.g., (S)CG-Config message) including an explicit indicator, e.g., BlindAdditionFailure, to reveal the SN addition failure. Such indicator may be a Boolean value, e.g., "1" and "0" represents "success" and "failure," respectively.

In some implementations, the target SN (e.g., the SN 15) may include only the explicit indicator (e.g., BlindAdditionFailure) in the X2AP/XnAP message (e.g., SN Addition Request Acknowledgement message) and/or the inter-node RRC message (e.g., (S)CG-Config message), without other information (e.g., the second configuration information).

In some implementations, the target SN (e.g., the SN 15) may implicitly indicate the failure of SN addition through at least one of the following ways: no SN TLA in the X2AP/XnAP message (e.g., SN Addition Request Acknowledgement message) and/or the inter-node RRC message (e.g., (S)CG-Config message), null of the second configuration information, and missing (or incomplete) configuration in the second configuration information. In some implementations, the SN may send an X2AP/XnAP message (e.g., SN Addition Reject message) to the MN (e.g., the MN 13). The X2AP/XnAP message (e.g., SN Addition Reject message) may include the reject cause and/or further admission control information (e.g., a barring timer).

In some implementations, the target SN (e.g., the SN 15) may include an SN addition setup timer in the X2AP/XnAP message (e.g., SN Addition Request Acknowledge message) and/or the inter-node RRC message (e.g., (S)CG-Config message). The target SN may start this timer when it sends the X2AP/XnAP message (e.g., SN Addition Request Acknowledge message) and/or the inter-node RRC message (e.g., (S)CG-Config message) to the MN (e.g., the MN 13). If the timer expires and the target SN does not receive the UE's further information or response, the target SN may clear the configuration and/or release the resources for the UE (e.g., the UE 11). For example, the UE's further information or response may be involved in the UE's random access procedure to the SN, or the UE's data transmission to the SN on the established SN terminated MCG bearer, SCG bearer or the split bearer. If the target SN finds that the UE is unable to access to the target SN due to the expiry of the SN addition setup timer, the target SN may further send a reject message (e.g., the SN Addition Reject message) to the MN to notify that the SN addition (e.g., the SN blind addition) fails. In another implementation, the target SN may send another type of reject message (e.g., an SN Addition Request Acknowledgement message with implicit or explicit indication of the SN addition failure) to the MN.

In some implementations, the target SN (e.g., the SN 15) may add the UE ID (e.g., the UE 11's ID) into its barring list and set a UE-specific barring timer. Before the UE-specific barring timer times out, the UE (e.g., the UE 11) is considered to be barred by the target SN, so that the UE cannot camp on or (re)select the target SN if needed. In some implementations, if the UE (e.g., the UE 11) is barred by the target SN, the UE cannot camp on or (re)select an SN, which may not be the target SN. In some implementations, if the UE (e.g., the UE 11) is barred by the target SN, the UE may send information to the MN via RRC message, wherein the information may be (but not limited to) the barring time and/or the barring probability.

In some implementations, upon the MN (e.g., the MN 13) receives the reject message (e.g., the SN Addition Reject message, or the SN Addition Request Acknowledgement message with implicit/explicit indication of SN addition failure) from the target SN (e.g., the SN 15), the MN may send an RRC message (e.g., an RRC (Connection) Reject message, or an RRC (Connection) Reconfiguration message) to the UE (e.g., the UE 11). The RRC message may include the target SN ID and a wait timer. The UE may start the wait timer when it receives the RRC message. Before the wait timer expires, the UE may regard itself barred by the target SN. Thus, the UE cannot camp on or (re)select the target SN before the wait timer expires.

In various implementations of the present disclosure, if the MN (e.g., the MN 13) identifies that the SN addition procedure fails, e.g., the MN receives an RRC message (e.g., RRC (Connection) Reestablishment Request message, SCG Failure Information message) from the UE including the information of the SN addition failure, the data path between the SN (e.g., the SN 15) and the terminal (e.g., the terminal 19) in CN is not successfully established (e.g., the target SN 15 does not reply the MN 13 with the SN TLA and TEID upon the MN 13 receives the X2AP/XnAP message (e.g., SN Addition Request Acknowledgement message), or the MN 13 receives X2AP/XnAP message (e.g., the SN Addition Reject message) from the target SN 15), the MN may perform at least one of Procedures I (e.g., performing normal SN addition), Procedure II (e.g., performing SN blind addition) and Procedure III (e.g., building the MCG bearer (e.g., MCG DRB, MN terminated MCG bearer) directly) as a response to the SN addition failure.

Procedure I

During Procedure I, the MN may perform normal SN addition based on the UE's measurement report in response to the SN addition failure.

Figure 4:
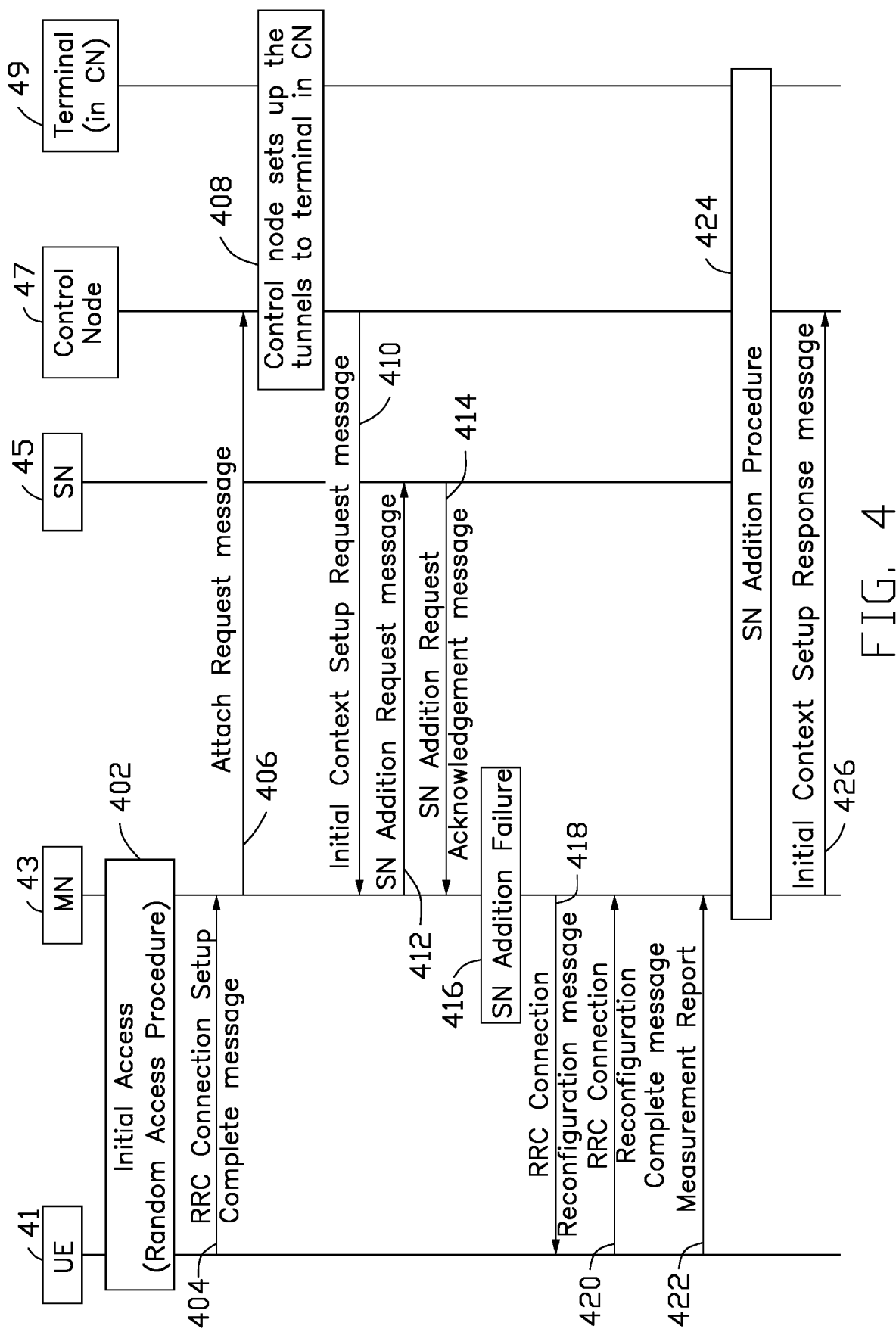
FIG. 4 illustrates a flowchart of Procedure I, in accordance with an implementation of the present disclosure.

FIG. 4 illustrates a flowchart of Procedure I, in accordance with an implementation of the present disclosure. The flowchart includes actions 402 to 426, in which actions 402, 404, 406, 408, 410, 412 and 414 substantially correspond to actions 102, 104, 106, 108, 110, 112 and 114 in FIG. 1.

As shown in FIG. 4, in action 402, the UE 41 performs an initial access procedure (e.g., RA procedure) with the MN 43. In action 404, the UE 41 may reply the MN 43 with an RRC message (e.g., RRC (Connection) Setup Complete message). Then in action 406, the MN 43 sends an Attach Request message (e.g., Registration Request message) to inform the control node 47 (e.g., MME or AMF) that the UE 41 attempts to attach to (or register on) the control node 47. In action 408, the control node 47 may set up tunnel(s) to a terminal 49 (e.g., S-GW, UPF, or SMF) in CN after a terminal selection procedure is performed. In action 410, the control node 47 may respond to the MN 43 with an Initial Context Setup Request message including the identification information of the terminal (e.g., the terminal 49). In action 412, the MN 43 may send an inter-node RRC message (e.g., (S)CG-ConfigInfo message) and/or an X2AP/XnAp message (e.g., SN Addition Request message) to the target SN 45. In action 414, the SN 45 may reply another inter-node RRC message (e.g., (S)CG-Config message) and/or an X2AP/XnAP message (e.g., SN Addition Request Acknowledgement message) to the MN 43.

In actions 416 and 418, upon the MN 43 detects the SN addition failure (e.g., SN blind addition failure), the MN 43 may send an RRC message (e.g., RRC (Connection) Reconfiguration message) including measurement configuration(s) to the UE 41 to configure the UE 41 to perform specific measurement(s). In some implementations, the MN 43 may send an RRC message (e.g., RRC (Connection) Reconfiguration message) to the UE 41 after the MN 43 receives the X2AP/XnAP message (e.g., SN Addition Request Acknowledgement message) from the SN 45. In actions 420, the UE 41 may respond another RRC message (e.g., an RRC (Connection) Reconfiguration Complete message) to the MN 43. In action 422, the UE 41 may send the measurement report to the MN 43. In action 424, based on the measurement report from the UE 41, the MN 43 may perform the SN addition procedure. Because the target SN 45 to be added is selected by the MN 43 based on the measurement report from the UE 41 performing measurement(s) configured by the MN 43, the SN addition procedure in action 424 can be considered as a normal SN addition. After the successful SN addition, the MN 43 may then send the Initial Context Setup Response message to the control node 47.

In Procedure I, the SN terminated MCG bearer, the split bearer and the SCG bearer may be built without (or with) building the MN terminated MCG bearer first. If the RRC message (e.g., RRC (Connection) Reconfiguration message) includes an MCG configuration to build the MN terminated MCG bearer, the UE 41 may build the MN terminated MCG bearer upon receiving the RRC message (e.g., RRC (Connection) Reconfiguration message) and replies with the RRC message (e.g., RRC (Connection) Reconfiguration Complete message) to the MN 43.

Figure 5:
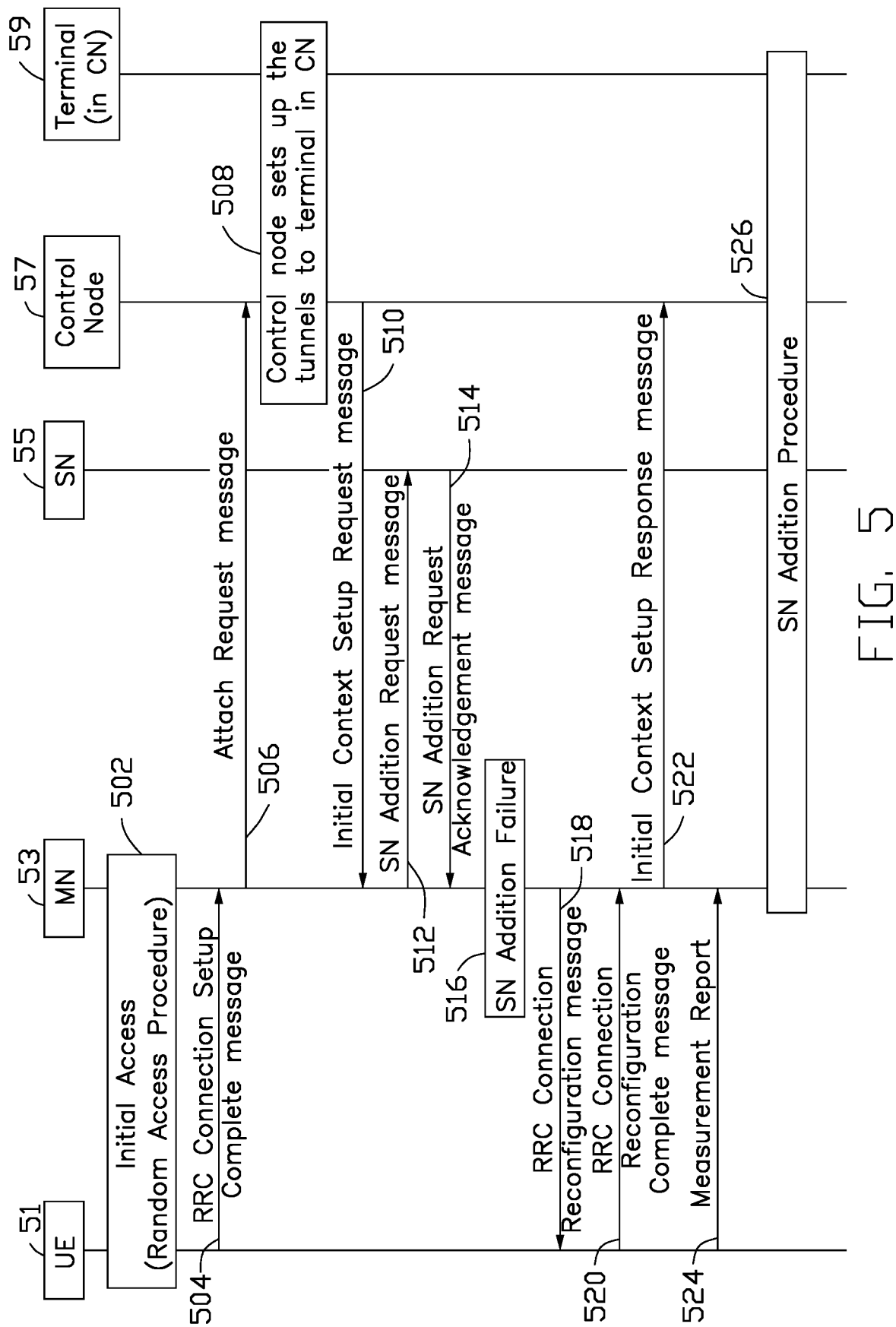
FIG. 5 illustrates a flowchart of Procedure I, in accordance with an implementation of the present disclosure.

FIG. 5 illustrates a flowchart of Procedure I, in accordance with another implementation of the present disclosure. The flowchart includes actions 502 to 526, in which actions 502, 504, 506, 508, 510, 512 and 514 substantially correspond to actions 102, 104, 106, 108, 110, 112 and 114 in FIG. 1.

As shown in FIG. 5, in action 502, the UE 51 may perform an initial access procedure (e.g., RA procedure) with the MN 53. In action 504, the UE 51 may reply the MN 53 with an RRC message (e.g., an RRC (Connection) Setup Complete message). Then in action 506, the MN 53 sends an Attach Request message (e.g., Registration Request message) to inform the control node 57 (e.g., MME or AMF) that the UE 51 attempts to attach to (or register on) the control node 57. In action 508, the control node 57 may set up tunnel(s) to a terminal 59 (e.g., S-GW, UPF, or SMF) in CN after a terminal selection procedure is performed. In action 510, the control node 57 may respond to the MN 53 with an Initial Context Setup Request message including the identification information of the terminal (e.g., the terminal 59). In action 512, the MN 53 may send an inter-node RRC message (e.g., (S)CG-ConfigInfo message) and/or an X2AP/XnAP message (e.g., SN Addition Request message) to the target SN 55. In action 514, the SN 55 may reply another inter-node RRC message (e.g., (S)CG-Config message) and/or X2AP/XnAP message (e.g., SN Addition Request Acknowledgement message) to the MN 53.

In the present implementation, in actions 516 to 524, upon the MN 53 detects the SN addition failure (e.g., SN blind addition failure), the MN 53 may send the Initial Context Setup Response message to the control node 57 after the MN 53 builds the MN terminated MCG bearer first via sending the RRC message (e.g., RRC (Connection) Reconfiguration message) to configure the UE 51 with the MCG configuration including at least one of: the NR PDCP configuration or the E-UTRA PDCP configuration, the RLC configuration, the MAC configuration, and the SDAP configuration. The Initial Context Setup Response message may include the MN TLA and TEID rather than the SN TLA and TEID. The MN 53 may also send the measurement configuration to the UE 51. Upon the UE 51 configures the MN terminated MCG bearer, the UE 51 may send the RRC message (e.g., RRC (Connection) Reconfiguration Complete message) to the MN 53. The UE 51 may also send the measurement report to the MN. Based on the measurement report, the MN can perform the SN addition procedure (e.g., normal SN addition).

Procedure II

During Procedure II, the MN may perform the SN blind addition to add another target SN in response to the SN addition failure. For example, after detecting the SN addition failure, the MN may continue to send the message (e.g., inter-node RRC message, X2AP/XnAP message, (S)CG-ConfigInfo message, SN Addition Request message) to another target SN selected by the MN after receiving the message (e.g., inter-node RRC message, (S)CG-Config message, X2AP/XnAP message, SN Addition Request Acknowledgement message, and SN Addition Reject message) from the previous target SN. Afterwards, the MN may check whether the SN addition (e.g., SN blind addition) is successful by receiving the message (e.g., inter-node RRC message, (S)CG-Config message, X2AP/XnAP message, SN Addition Request Acknowledgement message, and SN Addition Reject message). If the SN addition fails, the MN may choose one of the procedures (e.g., Procedures I, II and III) to perform.

In some implementations, the MN may be configured with an SN addition timer. The value of the SN addition timer may or may not depend on different UE's types/applications. The SN addition timer can be preconfigured, indicated by the UE in the RRC message (e.g., RRC (Connection) Setup Complete message (e.g., RRCConnectionSetupComplete, RRCSetupComplete)), or indicated by the control node (e.g., MME or AMF) in the Initial Context Setup Request message.

If the SN addition timer value is preconfigured, the MN starts this timer when the MN sends the first message (e.g., inter-node RRC message, X2AP/XnAP message, (S)CG-ConfigInfo message, and SN Addition Request message) to the first target SN. In some implementations, if the SN addition timer value is preconfigured, the MN may start this timer when the MN sends an RRC message (e.g., RRC (Connection) Reconfiguration message) the UE. The RRC message (e.g., RRC (Connection) Reconfiguration message) may include the configuration information on SN terminated MCG bearer, SCG bearer, or split bearer. If the SN addition timer value is indicated by the UE, the UE may start the timer when it sends the timer value to the MN. In some implementations, if the SN addition timer value is indicated by the UE, the MN may start the timer when it receives the RRC message (e.g., RRC (Connection) Reconfiguration Complete message, RRC (Connection) Setup Complete message, RRC (Connection) Reestablishment Request message) including the timer value from the UE. It is noted that UE NAS layer may decide the timer value and notify the value to the RRC layer, and afterwards the RRC layer may start the timer when it sends the time value to MN.

If the SN addition timer is indicated by the control node, the control node may start the SN addition timer when it sends the timer value to the MN. In some implementations, the MN may start the SN addition timer when it receives the timer value in the message (e.g., inter-node RRC message, X2AP/XnAP message, (S)CG-Config message, and SN Addition Request Acknowledgement message) from the control node. Before the SN addition timer expires, the MN may try the SN addition (e.g., SN blind addition). In case that the SN addition timer is preconfigured or in case that the MN starts the SN addition timer, if the SN addition timer expires and the MN does not receive the message (e.g., SN Addition Request Acknowledgement message, SN Addition Reject message, inter-node RRC message, (S)CG-Config message) from the SN that indicates the successful SN addition (e.g., SN blind addition), the MN may not perform the SN addition (e.g., SN blind addition) again. In case that the SN addition timer is indicated by the UE, if the UE does not receive the SN terminated MCG bearer configuration, the SCG bearer configuration, or the split bearer configuration before the SN addition timer expires, the UE may send an SN addition reject indication in an RRC message to the MN. In some implementations, this RRC message may be an RRC (Connection) Reconfiguration Complete message or an SCG Failure Information message. In some implementations, this RRC message may be an RRC (Connection) Reestablishment Request message. For example, the UE may directly send the SN addition reject indication in the RRC (Connection) Reestablishment Request message to the MN, which means the UE is not necessary to wait for the RRC (Connection) Reconfiguration message. It is expected that the UE may receive the SN terminated MCG bearer configuration, SCG bearer configuration, or the split bearer configuration before the SN addition timer expires. In case that the SN addition timer is indicated by the control node, if the control node does not receive the Initial Context Setup Response message including the SN TLA and TEID from the MN before the SN addition timer expires, the control node may send the Initial Context Setup Request message again and ask for the MN TEID and TLA only.

In some implementations, if the MN indicates the SN (blind) addition intention in the RRC message (e.g., RRC (Connection) Reconfiguration message) to the UE but there is neither the SCG bearer configuration nor the SN terminated MCG bearer configuration nor the split bearer configuration in the RRC message (e.g., RRC (Connection) Reconfiguration message), the UE may indicate an SN addition timer in the RRC message (e.g., RRC (Connection) Reconfiguration Complete message) to the MN. The UE starts the SN addition timer when the UE sends the RRC message (e.g., RRC (Connection) Reconfiguration Complete message). If the SN addition timer expires and the UE does not receive the SN terminated MCG bearer configuration, SCG bearer configuration or the split bearer configuration, the UE may send an SCG failure cause value that indicates the SN addition failure (e.g., SN blind addition failure) in the RRC message (e.g., RRC (Connection) Reconfiguration Complete message, RRC (Connection) Reestablishment Request message, SCG Failure Information message) to the MN. Alternatively, if the UE receives the RRC message (e.g., the RRC (Connection) Reconfiguration message) including a measurement configuration, the UE may send the measurement report to the MN when the SN addition timer expires, and trigger the normal SN addition. The measurement report may or may not further explicitly include the SCG failure cause value indicating the SN addition failure (e.g., SN blind addition failure).

In some implementations, the MN may be configured with a counter to calculate the maximum retry times to perform the SN addition (e.g., SN blind addition). The maximum retry times can be preconfigured, indicated by the UE in the RRC message (e.g., RRC (Connection) Setup Complete message (e.g., RRCConnectionSetupComplete, RRCSetupComplete)), or indicated by the control node (e.g., MME or AMF) in the Initial Context Setup Request message. The MN may increase the counter when one SN addition (e.g., SN blind addition) procedure is performed, when one target SN is selected, or when the MN sends an inter-node message (e.g., (S)CG-Config message) and/or an X2AP/XnAP message (e.g., SN Addition Request message) to the SN. The MN may reset the counter when the SN addition succeeds (e.g., when the MN receives the X2AP/XnAP message (e.g., SN Addition Request Acknowledgement message) from the SN, when the MN receives the (S)CG-Config message from the SN, when the MN receives the RRC message (e.g., RRC (Connection) Reconfiguration Complete message) from the UE), when the counter achieves the maximum retry timers, or when the MN receives the RRC message from the UE indicating that the UE does not require SN addition. If the total number of target SN to be added achieves the maximum retry times, the MN may not perform the SN addition (e.g., SN blind addition) again. For example, the MN may then turn to perform either Procedure I or Procedure III.

Procedure III

During Procedure III, the MN may decide to build the MCG bearer (e.g., MN terminated MCG bearer) directly upon detecting the SN addition failure. For example, the MN may build the MCG bearer (e.g., MN terminated MCG bearer) directly when receiving an indication of SN addition failure in the inter-node message (e.g., (S)CG-Config message) and/or the X2AP/XnAP message (e.g., SN Addition Request Acknowledgement message, SN Addition Reject message) from the SN, or when receiving an RRC message (e.g., RRC (Connection) Reconfiguration Complete message, RRC (Connection) Reestablishment Request message, SCG Failure Information message) from the UE indicating SN addition failure. The MN may establish the tunnel to the terminal (e.g., S-GW, UPF or SMF) in CN. In addition, the MN may also send the RRC (Connection) Reconfiguration message (e.g., RRCConnectionReconfiguration) to the UE to build the MCG bearer (e.g., MN terminated MCG bearer).

In some implementations, the RRC message (e.g., RRC (Connection) Reconfiguration message) sent by the MN to the UE may include the UE's NAS information in the IE dedicatedInfoNASList, which consists of per DRB IE dedicatedInfoNAS.

The RRC message (e.g., RRC (Connection) Reconfiguration message) sent by the MN to the UE may further include the required information in the dedicated radio resource configuration (e.g., IE RadioResourceConfigDedicated) to build up the MCG bearer (e.g., MN terminated MCG bearer). The dedicated radio resource configuration (e.g., IE RadioResourceConfigDedicated) may include the MAC configuration information (e.g., mac-MainConfig), the Physical layer configuration information (e.g., physicalConfigDedicated), and the DRB information (e.g., per DRB IE DRB-ToAddMod in the list IE DRB-ToAddModList). The DRB information may include the EPS bearer ID or the PDU session ID, the DRB ID, the SDAP configuration (if the MN is for NR), the PDCP configuration, the RLC configuration, the logical channel ID, the logical channel configuration, etc.

In some implementations, the RRC message (e.g., RRC (Connection) Reconfiguration message) sent by the MN to the UE may include the radio bearer configuration (e.g., RadioBearerConfig), which includes the DRB configuration (e.g., IE DRB-ToAddModList) consisting of a list of DRB-specific information such as the DRB ID, the PDCP configuration, the SDAP configuration (if the MN is for NR), and the EPS bearer ID or the PDU session ID. The DRB ID is associated to the DRB-specific information in the MCG configuration (e.g., IE MCG-Config).

Upon receiving the RRC message (e.g., RRC (Connection) Reconfiguration Complete message) from the UE and the MN knowing the MCG bearer (e.g., MN terminated MCG bearer) is successfully established, the MN may therefore send the Initial Context Setup Response message to the control node (e.g., MME or AMF) in CN. The Initial Context Setup Response message may include the MN TLA, which corresponds to the E-RAB ID or the PDU session ID provided by the control node.

In some implementations, after receiving a first RRC message (e.g., RRC (Connection) Reconfiguration message) including at least one SCG DRB configuration from the MN, the UE may send failure information via a second RRC message (e.g., RRC (Connection) Reestablishment Request message, RRC (Connection) Reconfiguration Complete message, or SCG Failure Information message) to the MN if the UE fails to add the target SN. The failure information may include one or more SCG failure cause values to indicate the cause(s) of SCG failure. For example, the SCG failure cause value may be implemented by (but not limited to) a reestablishment cause (e.g., IE ReesablishmentCause). The reestablishment cause may represent the reason for the UE to send the second RRC message (e.g., the RRC (Connection) Reestablishment Request message, RRC (Connection) Reconfiguration Complete message, or SCG Failure Information message).

In some implementations, the SCG failure cause value may indicate an expiry of the timer. For example, the UE may start a timer after receiving the first RRC message, and report the failure information including an SCG failure cause value of timer expiry when the timer expires. For another example, if the first RRC may include a plurality of SCG DRB configurations (e.g., SN terminated MCG bearer configuration, SCG bearer configuration, split bearer configuration), the UE may set a timer for each SCG DRB configuration, and report the failure information including an SCG failure cause value of timer expiry to the MCG when the timer expires. The mapping relationship between the SCG DRB configurations and the timer(s) can be many-to-one mapping or one-to-one mapping. For the former case, all SCG DRB configurations may share the same timer. For the latter case, each SCG DRB configuration may correspond to one of the timers, and the value of each timer could be different from each other.

In some implementations, the SCG failure cause value may indicate a reconfiguration failure of the first RRC message. For example, if the UE cannot successfully finish all commands in the first RRC message, the UE may set the SCG failure cause value to indicate a reconfiguration failure of the first RRC message. The commands in the first message may subject to the SN addition (e.g., SN blind addition, normal SN addition). In some implementations, in response to the reconfiguration failure, the MN may not know whether the normal SN addition or the SN blind addition causes the reconfiguration failure of the first RRC message. However, in some implementations, the MN may regard the SN (blind) addition fails when the MN receives the SCG failure cause value indicating a reconfiguration failure of the first RRC message.

In some implementations, the SCG failure cause value may indicate that the SN blind addition is recognized to fail at the UE side and no measurement report is sent to the MN yet.

In some implementations, the SCG failure cause value may indicate that the SN addition (e.g., SN blind addition, normal SN addition, PSCell addition for an SCG) is recognized to fail at the UE side. In such a case, the UE may not explicitly indicate whether the measurement report is not yet sent to the MN.

In some implementations, the SCG failure cause value may indicate that SN addition fails specifically due to the SCG configuration failure, implying other configuration (e.g., the MCG configuration) may be successfully.

In some implementations, the failure information in the second RRC message may include at least one cell ID (or ID of SN). The at least one cell ID may indicate the suitable or non-suitable cell(s) determined by the UE. For example, the cell IDs in the second RRC message may refer to the cells that the UE cannot successfully add.

In some implementations, the MN may ask the UE to add a plurality of SNs, and the UE may indicate the SCG failure cause value (e.g., SN addition failure cause, SN blind addition failure cause) via the second RRC message if all SNs assigned by the MN cannot be added. In such a case, if some of the SNs are successfully added while some are not, the second RRC message may include the IDs of SN (or cell IDs) that the UE can or cannot successfully add (e.g., the IDs of non-suitable cells, the IDs of suitable cells), but no SCG failure cause value.

In some implementations, the UE may indicate an SN addition failure (e.g., SN blind addition failure) via the SCG failure cause value in the second RRC message if at least one SN assigned by the MN cannot be added. The UE may further indicate the IDs of SN (or cell IDs) that the UE can or cannot add in the second RRC message.

In some implementations, the UE may indicate the IDs of SN (or cell IDs or SCG IDs) that the UE cannot successfully add respectively with their own SCG failure cause value (e.g., SN addition failure cause, SN blind addition failure cause). For example, if four SNs cannot be added by the UE, the UE may indicate four SN IDs and four associated SN (blind) addition causes in the second RRC message.

In some implementations, the first RRC message (e.g., RRC (Connection) Reconfiguration message) from the MN may include the DRB configuration (e.g., SN terminated MCG bearer configuration, SCG bearer configuration, or split bearer configuration and timer(s). All bearer configurations (e.g., SN terminated MCG bearer configuration, SCG bearer configuration, or split bearer configuration) may share the same timer, or each timer is corresponding to one of the bearer configurations (e.g., SN terminated MCG bearer configuration, SCG bearer configuration, split bearer configuration). It is possible that the MN may aim to configure the UE with a plurality of SNs.

Case 1: All SCG configuration(s) share one timer. The SCG configuration(s) may include (but not limited to) MN terminated MCG bearer configuration(s), SCG bearer configuration(s), or split bearer configuration(s).

In case 1, the UE may start the timer when the UE starts to configure the SCG bearer configuration(s), or when the UE receives the first RRC message (e.g., the RRC (Connection) Reconfiguration message). The first RRC message may include the SCG configuration(s). In some implementations, the UE stops the timer when the UE successfully adds at least one SCG configuration(s). In some implementations, the UE stops the timer when the UE successfully adds all SCG configuration(s). If the timer expires and the UE cannot add at least one SCG configuration, the UE may send a second RRC message (e.g., RRC (Connection) Reestablishment Request message, RRC (Connection) Reconfiguration Complete message, or SCG Failure Information message) including the failure information to the MN. The failure information may include at least one SCG failure cause value to indicate the cause of SCG failure, and/or include IDs of SN (or cell or SCG). In some implementations, the failure information may indicate the bearer (e.g., MN terminated MCG bearer, SCG bearer, or split bearer) that cannot be configured, and/or the IDs of bearer that cannot be successfully configured.

Case 2: Each SCG configuration is configured with one timer. The SCG configuration(s) may include (but not limited to) MN terminated MCG bearer configuration(s), SCG bearer configuration(s), or split bearer configuration(s).

In case 2, the UE may start a plurality of timers when the UE starts to configure the corresponding SCG configuration(s), or when the UE receives the first RRC message (e.g., the RRC (Connection) Reconfiguration message) from the MN. The first RRC message may include the SCG configuration(s). In some implementations, the UE may stop the timer when the UE successfully adds the corresponding SCG configuration(s). In some implementations, the UE may stop the timer when the UE successfully adds other SCG configuration(s). In some implementations, the UE may stop the timer when the UE sends an RRC message (e.g., RRC (Connection) Reestablishment Request message, RRC (Connection) Reconfiguration Complete message, or SCG Failure Information message) to the MN, even though the corresponding SCG configuration is not successfully configured. In some implementations, the timer may expire if the corresponding SCG configuration is not successfully configured. In some implementations, if one timer of one SCG configuration expires, the UE may stop other timers of the corresponding SCG configurations.

In some implementations, the UE may be preconfigured or instructed by the MN via the first RRC message (e.g., the RRC (Connection) Reconfiguration message) that the number of SNs (or cells or SCGs) should be added, which may be less than or equal to the number of SN IDs (or cell IDs or SCG IDs) given in first RRC message. Thus, before all timers expire, the UE may determine whether the SN addition is successful based on the number of SNs preconfigured to be instructed by the MN. Before all timers expires, if the UE successfully configures more or equal to the number of SNs given by the MN, the UE may reply the MN with an RRC message (e.g., the RRC (Connection) Reconfiguration Complete message), in which the IDs of SN (or cell or SCG) that are not successfully added may or may not be included. In such a case, the UE may stop all timers.

In some implementations, if the UE is not preconfigured or instructed by the MN in the first RRC message (e.g., the RRC (Connection) Reconfiguration message) that the number of SNs (or cells or SCGs) should be added, the UE may send the RRC message (e.g., RRC (Connection) Reestablishment Request message) to the MN to indicate the SN addition failure if all timers expire. Alternatively, the UE may send the RRC message (e.g., RRC (Connection) Reconfiguration Complete message) to the MN if at least one SCG configuration is successfully configured before the corresponding timer expires. The RRC message (e.g., RRC (Connection) Reconfiguration Complete message) may include the IDs of SN (or cell or SCG) that are successfully added, and/or the IDs of SN (or cell or SCG) that are not successfully added.

In some implementations, the timer for each SCG configuration may run independently. If one timer expires and the SCG configuration fails, the UE may reply the MN with an RRC message (e.g., the second RRC message) including the SCG failure cause value and the cell ID (or SN ID or SCG ID). If the SCG configuration succeeds before the timer expires, the UE may send an RRC message (e.g., RRC (Connection) Reconfiguration Complete message) including the cell ID (or SN ID or SCG ID) to the MN.

If the UE indicates an SN addition failure (e.g., SN blind addition failure) to the MN, the MN may perform the normal SN addition based on the UE's measurement report (Procedure I), or perform on SN blind addition for other target SNs (Procedure II), or build the MCG bearer (e.g., MN terminated MCG bearer) directly (Procedure III). If the UE indicates the SN (blind) addition failure to the MN (e.g., via sending the second RRC message), the UE may keep or apply the MCG configuration.

Note that the design of the second RRC message may generally be applied to any case that the UE receives the first RRC message including the SCG configuration from the MN, but the UE cannot successfully add the SN (or the cell or the SCG) or configure the SCG based on the information included in the first RRC message. For example, the cases can be an SN addition procedure, an SN modification procedure (MN or SN initiated), an SN release (MN or SN initiated), a change of SN (MN or SN initiated), etc. The SCG configuration(s) may include (but not limited to) MN terminated MCG bearer configuration(s), SCG bearer configuration(s), or split bearer configuration(s).

In some implementations, the MN may send a first RRC message (e.g., RRC (Connection) Reconfiguration message, or the RRC (Connection) Reject message) including a plurality of SN IDs (or cell IDs or SCG IDs) and corresponding wait timers to the UE. Many SN IDs (or cell IDs) may map to one wait timer. Alternatively, the SN IDs (or cell IDs or SCG IDs) and the wait timers are one-one mapping. The value of a wait timer may be determined by the MN or the corresponding SN. When the UE receives the first RRC message, the UE may start the wait timer(s). Before the wait timer expires, the UE may consider itself barred by the corresponding SN(s) (or cell(s) or SCG(s)). Thus, the UE cannot camp on or (re)select the corresponding SN (or cell or SCG) when the wait timer is still running. For example, if the UE is configured with Standalone (SA) mode, NR-NR DC mode or NE-DC mode, the UE may want to camp on or (re)select or add an NR gNB. However, if such NR gNB is the UE's previous assigned target SN but the UE fails to add this NR gNB and the UE is barred to access the NR gNB, the UE may not access or camp on or (re)select or add such NR gNB as the MN (or a cell in MCG or a cell in SCG) when the barring timer is running.

In some implementations, when the UE (re)selects a new MN and the wait timer sent by the previous MN is still running, the UE may inform the new (re)selected MN of the wait timer(s) and corresponding SN ID(s) (or cell ID(s) or SCG ID(s)) during an RRC (re)establishment procedure. For example, the UE may send the corresponding SN IDs (or cell ID(s) or SCG ID(s)) and the corresponding wait timer(s) to the new MN via an RRC message (e.g., RRC (Connection) Setup Request message, RRC (Connection) Setup Complete message, RRC (Connection) Reestablishment Request message, or SCG Failure Information message). The value of the wait timer can be the remaining time value during which the UE is barred by the corresponding SN (or cell or SCG). If the new MN knows the IDs of SN (or cell or SCG) which bars the UE, and/or the wait time during which the UE is barred by the corresponding SN, the MN may avoid adding such SN for the UE. In some implementations, when the UE camps on or (re)selects or performs a random access procedure to a new MN, the UE may stop the wait timer(s). In some implementations, when the wait timer expires, the UE may camp on or (re)select or perform a random access procedure to the cell (or node) corresponding to the wait timer.

In various implementations of the present disclosure, there are several conditions when the MN sends an RRC message to bar the UE from a plurality of SNs. For example, when the UE indicates the failure to configure the SCG (e.g., as the proposed RRC (Connection) Reestablishment Request Message Design) to the MN for certain actions (e.g., SN addition, SN release, SN change, and SN modification), the MN may send an RRC message to bar the UE from the indicated SN. If the UE already knows the indicated SN, the MN may only include the wait timer for the indicated SN without the SN ID (or cell ID or SCG ID) in the RRC message (e.g., the RRC (Connection) Reconfiguration message or the RRC (Connection) Reject message) to the UE. For another example, when the MN identifies the data path between the terminal (e.g., S-GW, UPF or SMF) in CN and the target SN is not successfully established (e.g., the MN receives the SN Addition Request Acknowledgement message including the explicit or implicit indication to reject to add the UE, or the MN receives the SN Addition Reject message), the MN may send the SN ID (or cell ID or SCG ID) and the wait timer to the UE via the RRC message. In the barring design, the UE may still access the MN even though the UE is barred from accessing (performing a random access procedure to), camping on, or (re)selecting the SN.

Figure 6:
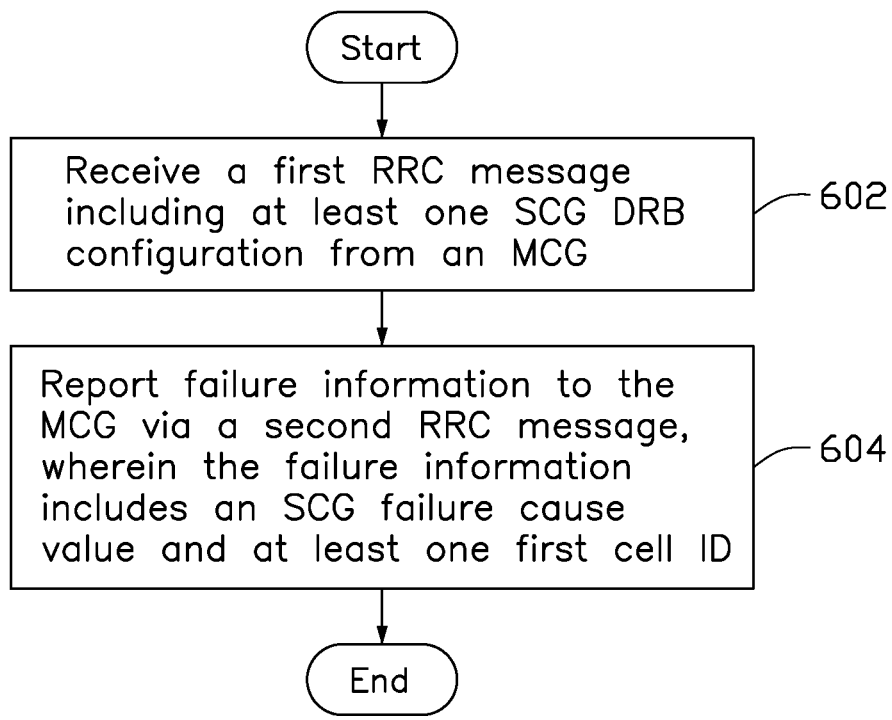
FIG. 6 illustrates a flowchart of a method for multi-connectivity, in accordance with an implementation of the present disclosure.

FIG. 6 illustrates a flowchart of a method for multi-connectivity, in accordance with an implementation of the present disclosure.

As shown in FIG. 6, in action 602, the UE may receive a first RRC message including at least one SCG DRB configuration from an MCG (e.g., an MN). The first RRC message can be any RRC message from the MCG (or MN) to the UE. For example, the first RRC message can be an RRC Connection Reconfiguration message (e.g., RRCConnectionReconfiguration).

In action 604, the UE may report failure information to the MCG via a second RRC message. The failure information may include an SCG failure cause value and at least one first cell ID. In some implementations, the first cell ID may indicate at least one non-suitable cell (or suitable cell) determined by the UE. It is noted that the second RRC message can be any RRC message from the UE to the MCG (or MN). For example, the second RRC message can be an RRC (Connection) Reestablishment Request message (e.g., RRCConnectionReestablishmentRequest) or an RRC (Connection) Reconfiguration Complete message (e.g., RRCReconfigurationComplete).

In some implementations, the UE may further perform at least one of the following procedures after reporting the failure information: (1) performing measurements configured by the MCG in Procedure I, (2) reporting a third RRC message including a list of at least one second cell ID to the MCG in Procedure II, and (3) establishing an MCG DRB to the MCG in Procedure III. In some implementations, the second cell ID may indicate at least one suitable cell determined by the UE. For example, the second cell ID may refer to a cell that the UE can successfully add.

Figure 7:
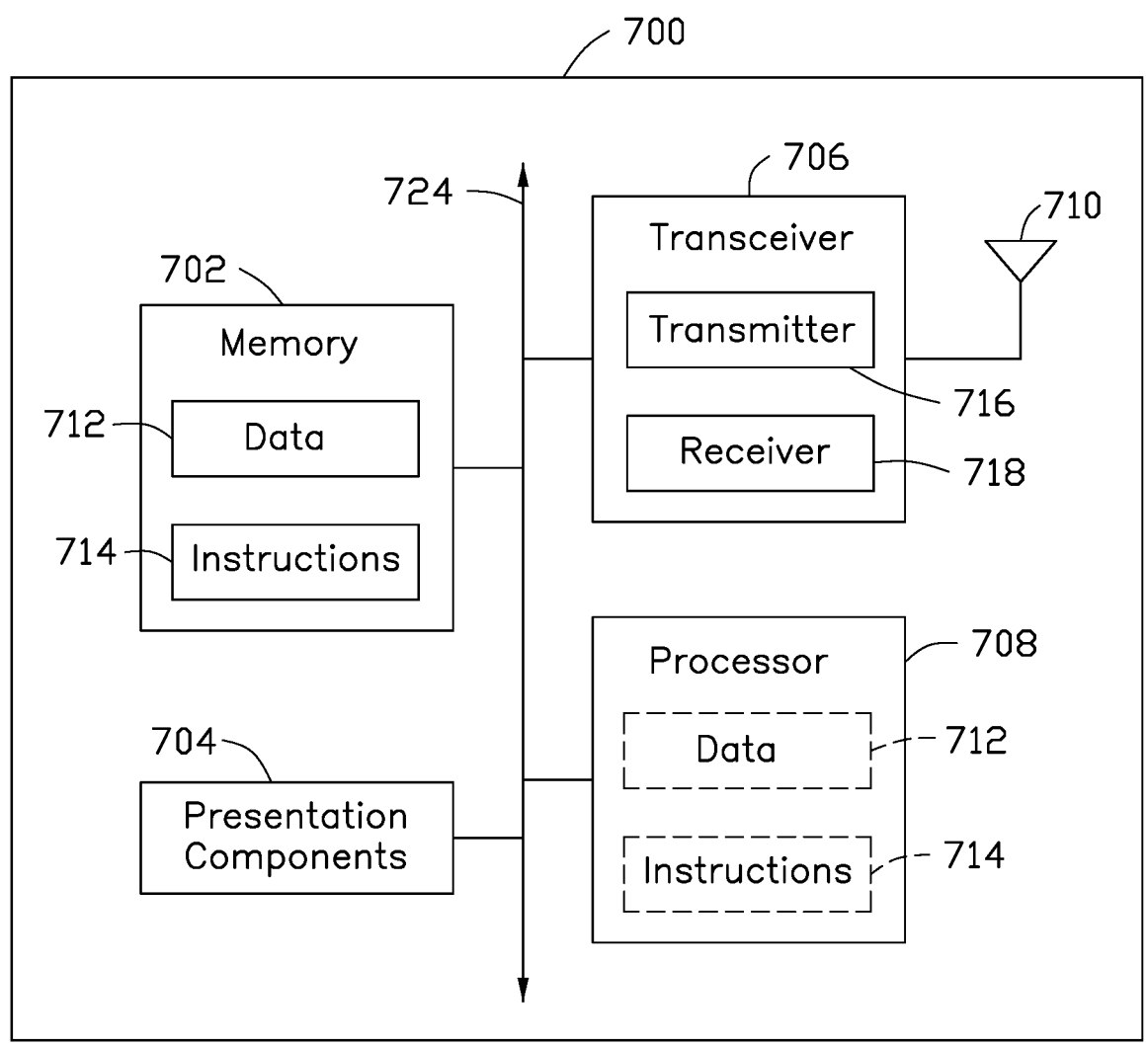
FIG. 7 illustrates a block diagram of a node for wireless communication, in accordance with various aspects of the present application.

FIG. 7 illustrates a block diagram of a node for wireless communication, in accordance with various aspects of the present application. As shown in FIG. 7, a node 700 may include a transceiver 706, a processor 708, a memory 702, one or more presentation components 704, and at least one antenna 710. The node 700 may also include an RF spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 724. In one implementation, the node 700 may be a UE or a base station that performs various functions described herein, for example, with reference to FIGS. 1 through 6.

The transceiver 706 having a transmitter 716 (e.g., transmitting/transmission circuitry) and a receiver 718 (e.g., receiving/reception circuitry) may be configured to transmit and/or receive time and/or frequency resource partitioning information. In some implementations, the transceiver 706 may be configured to transmit in different types of subframes and slots including, but not limited to, usable, non-usable and flexibly usable subframes and slot formats. The transceiver 706 may be configured to receive data and control channels.

The node 700 may include a variety of computer-readable media. Computer-readable media can be any available media that can be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory or other memory technology, CD-ROM, digital versatile disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 702 may include computer-storage media in the form of volatile and/or non-volatile memory. The memory 702 may be removable, non-removable, or a combination thereof. Exemplary memory includes solid-state memory, hard drives, optical-disc drives, etc. As illustrated in FIG. 7, the memory 702 may store computer-readable and/or computer-executable instructions 714 (e.g., software codes) that are configured to, when executed, cause the processor 708 to perform various functions described herein, for example, with reference to FIGS. 1 through 6. Alternatively, the instructions 714 may not be directly executable by the processor 708 but may be configured to cause the node 700 (e.g., when compiled and executed) to perform various functions described herein.

The processor 708 (e.g., having processing circuitry) may include an intelligent hardware device, a central processing unit (CPU), a microcontroller, an ASIC, etc. The processor 708 may include memory. The processor 708 may process the data 712 and the instructions 714 received from the memory 702, and information through the transceiver 706, the base band communications module, and/or the network communications module. The processor 708 may also process information to be sent to the transceiver 706 for transmission through the antenna 710, to the network communications module for transmission to a core network.

One or more presentation components 704 may present data indications to a person or other device. Examples of presentation components 704 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A User Equipment (UE) for multi-connectivity, comprising:
one or more non-transitory computer-readable media having computer-executable instructions embodied thereon; and
at least one processor coupled to the one or more non-transitory computer-readable media, and configured to execute the computer-executable instructions to:
receive a first Radio Resource Control (RRC) message comprising at least one Secondary Cell Group (SCG) Data Radio Bearer (DRB) configuration from a Master Cell Group (MCG);
start a first timer upon receiving the first RRC message;
report failure information to the MCG via an SCG Failure Information message when the first timer expires, the failure information comprising an SCG failure cause value and at least one first cell identity (ID) indicating at least one suitable cell determined by the UE, the SCG failure cause value indicating a reconfiguration failure of the first RRC message; and
stop the first timer when at least one of the following conditions is satisfied:
initiating an RRC reestablishment procedure by sending an RRC reestablishment request message to the MCG;
sending the SCG Failure Information message to the MCG before the first timer expires; and
successfully adding the SCG DRB configuration.

2. The UE according to claim 1, wherein the at least one SCG DRB configuration comprises a first SCG DRB configuration and a second SCG DRB configuration, and the at least one processor is further configured to execute the computer-executable instructions to:
set the first timer for the first SCG DRB configuration; and
set a second first timer for the second SCG DRB configuration.

3. The UE according to claim 2, wherein the first timer and the second timer have different values.

4. The UE according to claim 1, wherein the at least one processor is further configured to execute the computer-executable instructions to:
perform at least one of a plurality of procedures after reporting the failure information, the plurality of procedures comprising:
performing measurements configured by the MCG; and
establishing an MCG DRB to the MCG.

5. A method performed by a User Equipment (UE) for multi-connectivity, comprising:
receiving a first Radio Resource Control (RRC) message comprising at least one Secondary Cell Group (SCG) Data Radio Bearer (DRB) configuration from a Master Cell Group (MCG);
starting a first timer upon receiving the first RRC message;
reporting failure information to the MCG via an SCG Failure Information message when the first timer expires, the failure information comprising an SCG failure cause value and at least one first cell identity (ID) indicating at least one suitable cell determined by the UE, the SCG failure cause value indicating a reconfiguration failure of the first RRC message; and stopping the first timer when at least one of the following conditions is satisfied:
  initiating an RRC reestablishment procedure by sending an RRC reestablishment request message to the MCG;
  sending the SCG Failure Information message to the MCG before the first timer expires; and
  successfully adding the SCG DRB configuration.

6. The method according to claim 5, wherein the at least one SCG DRB configuration comprises a first SCG DRB configuration and a second SCG DRB configuration, and the method further comprises:
  setting, by the UE, the first timer for the first SCG DRB configuration; and
  setting, by the UE, a second timer for the second SCG DRB configuration.

7. The method according to claim 6, wherein the first timer and the second timer have different values.

8. The method according to claim 5, further comprising:
  performing at least one of a plurality of procedures after reporting the failure information, the plurality of procedures comprising:
  performing measurements configured by the MCG; and
  establishing an MCG DRB to the MCG.

9. A base station for multi-connectivity, comprising:
  one or more non-transitory computer-readable media having computer-executable instructions embodied thereon; and
  at least one processor coupled to the one or more non-transitory computer-readable media, and configured to execute the computer-executable instructions to:
    transmit a first Radio Resource Control (RRC) message comprising a timer and at least one Secondary Cell Group (SCG) Data Radio Bearer (DRB) configuration to a User Equipment (UE), the timer being configured to be started by the UE when the UE receives the first RRC message; and
    receive failure information from the UE via an SCG Failure Information message after the timer expires, the failure information comprising an SCG failure cause value and at least one first cell identity (ID) indicating at least one suitable cell determined by the UE, the SCG failure cause value indicating a reconfiguration failure of the first RRC message, wherein the timer is configured to be stopped by the UE when at least one of the following conditions is satisfied:
    initiating an RRC reestablishment procedure by sending an RRC reestablishment request message to the MCG;
    sending the SCG Failure Information message to the MCG before the timer expires; and
    successfully adding the SCG DRB configuration.

10. The base station according to claim 9, wherein the at least one processor is further configured to execute the computer-executable instructions to:
  perform at least one of a plurality of procedures in response to the failure information, the plurality of procedures comprising:
  transmitting a measurement configuration to the UE;
  adding an SCG for the UE; and
  establishing an MCG DRB to the UE.

* * * * *